United States Patent
Zhou et al.

(10) Patent No.: US 9,605,202 B2
(45) Date of Patent: Mar. 28, 2017

(54) SILICATE LUMINESCENT MATERIALS DOPED WITH METAL NANO PARTICLES AND PREPARATION METHODS THEREFOR

(75) Inventors: Mingjie Zhou, Shenzhen (CN); Jun Liu, Shenzhen (CN); Rong Wang, Shenzhen (CN); Guitang Chen, Shenzhen (CN)

(73) Assignee: OCEAN'S KING LIGHTING SCIENCE & TECHNOLOGY CO., LTD., Shenzhen (CN)

( * ) Notice: Subject to any disclaimer, the term of this patent is extended or adjusted under 35 U.S.C. 154(b) by 393 days.

(21) Appl. No.: 14/372,742

(22) PCT Filed: Mar. 29, 2012

(86) PCT No.: PCT/CN2012/073245
§ 371 (c)(1),
(2), (4) Date: Jul. 16, 2014

(87) PCT Pub. No.: WO2013/143102
PCT Pub. Date: Oct. 3, 2013

(65) Prior Publication Data
US 2014/0332721 A1    Nov. 13, 2014

(51) Int. Cl.
*C09K 11/79* (2006.01)
*C09K 11/87* (2006.01)
*C09K 11/77* (2006.01)

(52) U.S. Cl.
CPC ........ *C09K 11/873* (2013.01); *C09K 11/7774* (2013.01); *C09K 11/7792* (2013.01)

(58) Field of Classification Search
CPC .............. C09K 11/025; C09K 11/7774; C09K 11/77792
See application file for complete search history.

(56) References Cited

U.S. PATENT DOCUMENTS 3,855,143 A * 12/1974 Schuil ............... C09K 11/7774
                                                         252/301.4 F
2013/0075659 A1    3/2013 Zhou
(Continued)

FOREIGN PATENT DOCUMENTS

CN    1800302 A    7/2006
CN    101033398 A    9/2007
(Continued)

OTHER PUBLICATIONS

G. Blasse and A. Bril. Structure and Eu3+-Fluorescence of Lithium and Sodium Lanthanide Silicates and Germanates. J. inorg. nucl. Chem., 1967, vol. 29, pp. 2231 to 2241.
(Continued)

*Primary Examiner* — Carol M Koslow
(74) *Attorney, Agent, or Firm* — Shimokaji IP

(57) ABSTRACT

The invention belongs to the field of luminescent materials. Disclosed are silicate luminescent materials doped with metal nano particles and preparation methods there for. The silicate luminescent materials doped with metal nano particles are represented by the chemical formula: $MLn_{1-x}SiO_4$: $xRE,yA$; wherein M is one or two elements selected from Li, Na and K; Ln is one or two elements selected from Y, Sc, La and Lu; A is a metal nano particle selected from Ag, Au, Pt, Pd and Cu; RE is one or two ions selected from Eu, Gd, Tb, Tm, Sm, Ce and Dy; $0<x\leq 0.1$; $0<y\leq 0.005$. When silicate luminescent materials doped with metal nano particles of the invention are excited by electron beam, they have higher luminescent efficiency. The luminescent materials are good to be used in field emission light source devices.

14 Claims, 1 Drawing Sheet

(56) References Cited

U.S. PATENT DOCUMENTS

2013/0092876 A1    4/2013   Zhou et al.
2013/0112919 A1    5/2013   Zhou et al.
2013/0126784 A1    5/2013   Zhou et al.

FOREIGN PATENT DOCUMENTS

CN         102382646 A    3/2012
WO    WO2007069869 A1    6/2007

OTHER PUBLICATIONS

A V Sidorenko, et al. Lanthanide level location and charge carrier trapping in $LiLnSiO_4:Ce^{3+}, Sm^{3+}$, Ln = Y or Lu. Journal of Physics: Condensed Matter. 18 (2006) 4503-4514, doi: 10.1088/0953-8984/18/19/006.

\* cited by examiner

SILICATE LUMINESCENT MATERIALS DOPED WITH METAL NANO PARTICLES AND PREPARATION METHODS THEREFOR

FIELD OF THE INVENTION

The invention relates to the field of luminescent materials, particularly to silicate luminescent materials doped with metal nano particles and preparation methods there for.

BACKGROUND OF THE INVENTION

In the 1960s, Ken Shoulder proposed ideas based on field emission arrays (FEAs) electron beam microelectronic devices, thus, to design and produce panel display and light resource devices by using FEAs has drawn the public's attention. Similar to the working principle of conventional cathode-ray tube (CRT), such new field emission display lights and forms images by electron beam bombarding on red, green blue trichromatic luminescent powders. Field emission display has potential advantages in luminance, visual angle, response time, working temperature range, power consumption and other aspects.

A key factor to preparation of field emission display of high performances is to prepare luminescent material of excellent performance. At present, luminescent materials used in field emission devices are sulfide series, oxide series and oxysulfide series luminescent powders. As for sulfide series and oxysulfide series luminescent powders, they have relatively high luminance and electrical conductivity, but, under the large electron beam bombardment, they prone to decomposing into sulfur, which can poison the tip of cathode and produce other precipitates covering the luminescent powders, thus reducing the luminous efficiency of luminescent powders. Oxide and silicate luminescent powders have good stability but the luminous efficiency is not high enough yet.

SUMMARY OF THE INVENTION

One problem to be solved by the present invention is to provide silicate luminescent materials doped with metal nano particles that can improve luminescent efficiency of field emission device.

The technical solution of the present invention will be described below.

A silicate luminescent material doped with metal nano particles represented as $MLn_{1-x}SiO_4$:xRE, containing A; wherein M is one or two elements selected from Li, Na and K; Ln is one or two elements selected from Y, Sc, La and Lu; A is a metal nano particle selected from Ag, Au, Pt, Pd and Cu; RE is one or two ions selected from Eu, Gd, Tb, Tm, Sm, Ce and Dy; x and is a stoichiometric number in a range of $0<x\le0.1$; y is a molar ratio of A to M in a range of $0<y\le0.005$. Preferably, x is in a range of $0.001\le x\le0.04$, y is in a range of $0.00003\le y\le0.003$.

Another problem to be solved by the present invention is to provide method for preparing the silicate luminescent material doped with metal nano particles, comprising:

S1. According to the stoichiometric ratio of corresponding elements in the chemical formula of $MLn_{1-x}SiO_4$:xRE, containing A, weighing compound containing M, compound containing Ln, compound containing RE and silica aerogel containing A, then grinding and mixing to obtain mixed powders;

S2, in air or in reducing atmosphere, calcining the mixed powders obtained from S1 at a constant temperature ranged from 800° C. to 1600° C. for 1 h to 10 h; then cooling to room temperature, taking out the calcined matter and grinding to obtain silicate luminescent material doped with metal nano particles represented as $MLn_{1-x}SiO_4$:xRE, containing A, wherein the reducing atmosphere is mixed gases of $N_2$ and $H_2$ in a volume ratio of 95:5.

M is one or two elements selected from Li, Na and K; Ln is one or two elements selected from Y, Se, La and Lu; A is a metal nano particle selected from Ag, Au, Pt, Pd and Cu; RE is one or two ions selected from Eu, Gd, Tb, Tm, Sm, Ce and Dy; x is a stoichiometric number in a range of $0<x\le0.1$; y is a molar ratio of A to M in a range of $0<y\le0.005$.

Preferably, A is selected from Ag, Au, Pt, Pd and Cu; RE is one ion selected from Eu, Gd, Tb, Tm, Sm, Ce and Dy.

In S1 of the above preparation method, the compound containing M is selected from oxide of M, nitrate of M, carbonate of M and oxalate of M; the compound containing Ln is selected from oxide of Ln, nitrate of Ln, carbonate of Ln and oxalate of Ln; the compound containing RE is selected from oxide of RE, nitrate of RE, carbonate of RE and oxalate of RE.

In S1 of the above preparation method, the silica aerogel containing A is prepared by the following steps:

S11. Weighing silica aerogel and adding into ethanol solution containing A ions or colloidal nanoparticles of A, then stiffing at 50° C. to 75° C. for 0.5 h to 3 h to thoroughly dissolve silica aerogel, obtaining mixed solution; where molar concentration of A ions or colloidal nanoparticles of A is in a range of $1.25\times10^{-3}$ mol/L to $1.5\times10^{-5}$ mol/L; molar ratio of silica aerogel to A ions or colloidal nanoparticles of A is in a range of $3.3\times10^4$ to 328:1.

S12. Stirring and ultrasonically treating the mixed solution, then drying the mixed solution at 60° C. to 150° C. to remove solvent, obtaining dried matter;

S13. Grinding the dried matter into powders, calcining the powders at 600° C. to 1300° C. for 0.5h to 3 h, cooling to room temperature to obtain silica aerogel containing A.

Preferably, in S11, aperture size of the silica aerogel is in a range of 20 nm to 100 nm, porosity is in a range of 92% to 98%.

The silicate luminescent materials doped with metal nano particles of the invention show relatively high luminescent efficiency under excitation by electron beam, thus can be used in field emission light source devices.

In addition, the preparation method of the present invention is simple, non-polluting, high-quality, low-cost, and can be widely used in the manufacture of luminescent materials.

DETAILED DESCRIPTION OF ILLUSTRATED EMBODIMENTS

In one embodiment, the silicate luminescent materials doped with metal nano particles is represented as $MLn_{1-x}SiO_4:xRE$, containing A; wherein M is one or two elements selected from Li, Na and K; Ln is one or two elements selected from Y, Sc, La and Lu; A is a metal nano particle selected from Ag, Au, Pt, Pd and Cu; RE is one or two ions selected from Eu, Gd, Tb, Tm, Sm, Ce and Dy; x is a stoichiometric number in a range of $0<x≤0.1$; y is a molar ratio of A to M in a range of $0<y≤0.005$. Preferably, x is in a range of $0.001≤x≤0.04$, y is in a range of $0.00003≤y≤0.003$.

Figure 1:
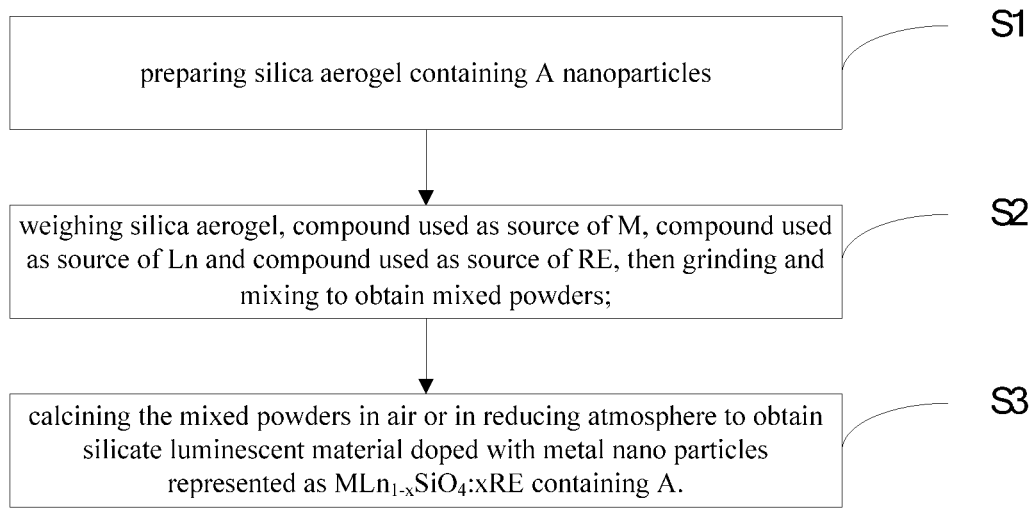
FIG. 1 is a flow diagram showing the preparation of silicate luminescent materials doped with metal nano particles.

As shown in FIG. 1, method for preparing the silicate luminescent materials doped with metal nano particles comprises the following steps:

S1, preparing silica aerogel containing A;

Firstly, silica aerogel was weighed and added into ethanol solution containing A ions or colloidal nanoparticles of A while stirring at 50° C. to 75° C. for 0.5 h to 3 h, silica aerogel was thoroughly dissolved to form mixed solution, where molar concentration of A ions or colloidal nanoparticles of A was in a range of $1.25×10^{-3}$ mol/L to $1.5×10^{-5}$ mol/L, and molar ratio of silica aerogel to A ions or colloidal nanoparticles of A was in a range of $3.3×10^4$ to 328:1.

Next, the mixed solution was stirred, ultrasonically treated, then dried at 60° C. to 150° C. to remove solvent and obtain dried matter;

At last, the dried matter was grinded into powders. The powders was calcined at 600° C. to 1300° C. for 0.5h to 3h, then cooled to room temperature to obtain silica aerogel containing A.

S2. According to the stoichiometric ratio of corresponding elements in the chemical formula of $MLn_{1-x}SiO_4:xRE$, containing A, weighing compound containing M, compound containing Ln, compound containing RE and silica aerogel containing A, then grinding and mixing to obtain mixed powders;

S3, in air or in reducing atmosphere, calcining the mixed powders obtained from S2 at a constant temperature ranged from 800° C. to 1600° C. for 1 h to 10 h; then cooling to room temperature, taking out the calcined matter and grinding to obtain silicate luminescent material doped with metal nano particles represented as $MLn_{1-x}SiO_4:xRE$, containing A. During the calcination, the compound containing RE subjected to pyrolysis or reducing atmosphere is reduced to RE metal element.

M is one or two elements selected from Li, Na and K; Ln is one or two elements selected from Y, Sc, La and Lu; A is a metal nano particle selected from Ag, Au, Pt, Pd and Cu; RE is one or two ions selected from Eu, Gd, Tb, Tm, Sm, Ce and Dy; x is a stoichiometric number in a range of $0<x≤0.1$; y is a molar ratio of A to M in a range of $0<y≤0.005$.

In S1 of the above preparation method, aperture size of the silica aerogel is preferably in a range of 20-100 nm, porosity is preferably in a range of 92% to 98%.

In S2 of the above preparation method, the compound containing M is selected from oxide of M, nitrate of M, carbonate of M and oxalate of M; the compound containing Ln is selected from oxide of Ln, nitrate of Ln, carbonate of Ln and oxalate of Ln; the compound containing RE is selected from oxide of RE, nitrate of RE, carbonate of RE and oxalate of RE.

When weighing the compound containing M, an excess of compound containing M of 10 mol % (molar percent) is preferred.

In S3 of the above preparation method, the reducing atmosphere is preferably mixed gases of $N_2$ and $H_2$, the volume ratio of $N_2$ to $H_2$ is 95:5.

The silicate luminescent materials doped with metal nano particles of the invention show relatively high luminescent efficiency under excitation by electron beam, thus can be used in field emission light source devices.

The method for preparing silicate luminescent materials doped with metal nano particles of the present invention is simple, non-polluting, high-quality, low-cost, and can be widely used in the manufacture of luminescent materials.

Further description of the present invention will be illustrated, which combined with preferred embodiments and the drawings.

Example 1

$NaY_{0.999}SiO_4: 0.001Tm^{3+}$ containing Ag

Silica aerogel having an aperture size in a range of 20 nm to 100 nm and porosity in a range of 92% to 98% was used. Firstly, 0.3 g of silica aerogel was weighed and added into 10 mL of ethanol solution containing $1.5×10^{-5}$ mol/L $AgNO_3$ while stirring at 50° C. for 3 h, then ultrasonically treated for 10 min and dried at 60° C. The dried matter was grinded into powders. The powders were pre-calcined at 600° C. for 4 h. 0.7150 g of $Y_2(CO_3)_3$, 0.2543 g of $Na_2CO_3$ (in excess of 20%), 0.0010 g of $Tm_2(CO_3)_3$ and 0.2524 g of silica aerogel containing Ag were weighed, grinded and mixed to obtain mixed powders. In air atmosphere, the mixed powders were calcined constantly at 800° C. for 10 h. The obtained product was cooled to room temperature. The obtained silicate luminescent material doped with metal nano particles was represented as $NaY_{0.999}SiO_4:0.001Tm^{3+}$ containing Ag.

Example 2

$LiLa_{0.992}SiO_4: 0.008Ce^{3+}$ containing Au

Silica aerogel having an aperture size in a range of 20 nm to 100 nm and porosity in a range of 92% to 98% was used. Firstly, 0.4 g of silica aerogel was weighed and added into 20 mL of ethanol solution containing $2.345×10^{-5}$ mol/L colloidal nanoparticles of Au while stirring at 60° C. for 2 h, then ultrasonically treated for 10 min and dried at 80° C. The dried matter was grinded into powders. The powders were pre-calcined at 800° C. for 2 h. 0.6464 g of $La_2O_3$, 0.1626 g of $Li_2CO_3$ (in excess of 10%), 0.0055 g of $CeO_2$ and 0.2525 g of silica aerogel containing Au were weighed, grinded and mixed to obtain mixed powders. In reducing atmosphere of mixed gases of $N_2$ and $H_2$ in a volume ratio of 95:5, the mixed powders were calcined constantly at 1450° C. for 4 h. The obtained product was cooled to room temperature. The obtained silicate luminescent material doped with metal nano particles was represented as $LiLa_{0.992}SiO_4: 0.008Ce^{3+}$ containing Au.

Example 3

$KLu_{0.96}SiO_4: 0.02Eu^{3+}, 0.02Gd^{3+}$ containing Pt

Silica aerogel having an aperture size in a range of 20 nm to 100 nm and porosity in a range of 92% to 98% was used. Firstly, 1.0 g of silica aerogel was weighed and added into 30 mL of ethanol solution containing $5.43×10^{-4}$ mol/L colloidal nanoparticles of Pt while stirring at 70° C. for 0.5 h, then ultrasonically treated for 10 min and dried at 150° C. The dried matter was grinded into powders. The powders were pre-calcined at 1000° C. for 4 h. 0.4044 g of $KNO_3$, 0.7640 g of $Lu_2O_3$, 0.0137 g of $Gd(NO_3)_3$, 0.0271 g of $Eu(NO_3)_3$ and 0.2526 g of silica aerogel containing Pt were weighed, grinded and mixed to obtain mixed powders. In air atmosphere, the mixed powders were calcined constantly at 1600° C. for 1 h. The obtained product was cooled to room temperature. The obtained silicate luminescent material doped with metal nano particles was represented as $KLu_{0.96}SiO_4$: $0.02Eu^{3+}$, $0.02Gd^{3+}$ containing Pt

Example 4

$Na_{0.9}Li_{0.1}Sc_{0.2}Y_{0.792}SiO_4$: $0.008Dy^{3+}$ containing Pd

Silica aerogel having an aperture size in a range of 20 nm to 100 nm and porosity in a range of 92% to 98% was used. Firstly, 0.28 g of silica aerogel was weighed and added into 15 mL of ethanol solution containing $1.2266 \times 10^{-4}$ mol/L colloidal nanoparticles of Pd while stirring at 60° C. for 2 h, then ultrasonically treated for 10 min and dried at 70° C. The dried matter was grinded into powders. The powders were pre-calcined at 900° C. for 2 h. 0.2003 g of $Na_2NO_3$ (in excess of 5%), 0.0163 g of $Li_2CO_3$ (in excess of 10%), 0.3577 g of $Y_2O_3$, 0.0060 g of $Dy_2O_3$ and 0.2524 g of silica aerogel containing Pd were weighed, grinded and mixed to obtain mixed powders. In air atmosphere, the mixed powders were calcined constantly at 1350° C. for 4 h. The obtained product was cooled to room temperature. The obtained silicate luminescent material doped with metal nano particles was represented as $Na_{0.9}Li_{0.1}Sc_{0.2}Y_{0.792}SiO_4$: $0.008Dy^{3+}$ containing Pd.

Example 5

$NaLu_{0.98}SiO_4$: $0.02Tb^{3+}$ containing Ag

Silica aerogel having an aperture size in a range of 20 nm to 100 nm and porosity in a range of 92% to 98% was used. Firstly, 0.35 g of silica aerogel was weighed and added into 25 mL of ethanol solution containing $7.08 \times 10^{-4}$ mol/L $AgNO_3$ while stirring at 65° C. for 1.5 h, then ultrasonically treated for 10 min and dried at 120° C. The dried matter was grinded into powders. The powders were pre-calcined at 1000° C. for 2 h. 0.2680 g of $Na_2C_2O_4$, 1.2034 g of $Lu_2(C_2O_4)_3$, 0.0233 g of $Tb_2(C_2O_4)_3$ and 0.2523 g of calcined silica aerogel were weighed, grinded and mixed to obtain mixed powders. In reducing atmosphere of mixed gases of $N_2$ and $H_2$ in a volume ratio of 95:5, the mixed powders were calcined constantly at 1400° C. for 6 h. The obtained product was cooled to room temperature. The obtained silicate luminescent material doped with metal nano particles was represented as $NaLu_{0.98}SiO_4$: $0.02Tb^{3+}$ containing Ag.

Example 6

$NaY_{0.95}SiO_4$: $0.05Sm^{3+}$ containing Ag

Silica aerogel having an aperture size in a range of 20 nm to 100 nm and porosity in a range of 92% to 98% was used. Firstly, 0.3 g of silica aerogel was weighed and added into 20 mL of ethanol solution containing $1.25 \times 10^{-3}$ mol/L $AgNO_3$ while stirring at 60° C. for 2 h, then ultrasonically treated for 10 min and dried at 100° C. The dried matter was grinded into powders. The powders were pre-calcined at 800° C. for 2 h. 0.3400 g of $NaNO_3$ 0.4290 g of $Y_2O_3$, 0.0349 g of $Sm_2O_3$ and 0.2525 g of calcined silica aerogel were weighed, grinded and mixed to obtain mixed powders. In air atmosphere, the mixed powders were calcined constantly at 1200° C. for 6 h. The obtained product was cooled to room temperature. The obtained silicate luminescent material doped with metal nano particles was represented as $NaY_{0.95}SiO_4$: $0.05 Sm^{3+}$ containing Ag.

Example 7

$KLa_{0.99}SiO_5$: $0.01Ce^{3+}$ containing Cu

Silica aerogel having an aperture size in a range of 20 nm to 100 nm and porosity in a range of 92% to 98% was used. Firstly, 0.4 g of silica aerogel was weighed and added into 15 mL of ethanol solution containing $3.1266 \times 10^{-4}$ mol/L colloidal nanoparticles of Cu while stirring at 60° C. for 1.5 h, then ultrasonically treated for 10 min and dried at 70° C. The dried matter was grinded into powders. The powders were pre-calcined at 800° C. for 2 h. 0.2764 g of $K_2CO_3$, 0.6451 g of $La_2O_3$, 0.0108 g of $Ce_2(C_2O_4)_3$ and 0.2527 g of silica aerogel containing Cu were weighed, grinded and mixed to obtain mixed powders. In reducing atmosphere of mixed gases of $N_2$ and $H_2$ in a volume ratio of 95:5, the mixed powders were calcined constantly at 1500° C. for 4 h. The obtained product was cooled to room temperature. The obtained silicate luminescent material doped with metal nano particles was represented as $KLa_{0.99}SiO_5$: $0.01Ce^{3+}$ containing Cu.

Example 8

$NaY_{0.9}SiO_4$: $0.1Tb^{3+}$ containing Ag

Silica aerogel having an aperture size in a range of 20 nm to 100 nm and porosity in a range of 92% to 98% was used. Firstly, 0.35 g of silica aerogel was weighed and added into 25 mL of ethanol solution containing $7.08 \times 10^{-4}$ mol/L $AgNO_3$ while stirring at 65° C. for 1.5 h, then ultrasonically treated for 10 min and dried at 120° C. The dried matter was grinded into powders. The powders were pre-calcined at 800° C. for 2 h. 0.2332 g of $Na_2CO_3$ (in excess of 10%), 0.4065 g of $Y_2O_3$, 0.0748 g of $Tb_4O_7$ and 0.2523 g of calcined silica aerogel were weighed, grinded and mixed to obtain mixed powders. In reducing atmosphere of mixed gases of $N_2$ and $H_2$ in a volume ratio of 95:5, the mixed powders were calcined constantly at 1250° C. for 6 h. The obtained product was cooled to room temperature. The obtained silicate luminescent material doped with metal nano particles was represented as $NaY_{0.9}SiO_4$: $0.1Tb^{3+}$ containing Ag.

Comparative Example 1

$NaY_{0.9}SiO_4$: $0.1Tb^{3+}$ 0.2332 g of $Na_2CO_3$ (in excess of 10 mol %), 0.4065 g of $Y_2O_3$, 0.0748 g of $Tb_4O_7$ and 0.2523 g of silica aerogel were weighed, grinded and mixed to obtain mixed powders. In reducing atmosphere of mixed gases of $N_2$ and $H_2$ in a volume ratio of 95:5, the mixed powders were calcined constantly at 1250° C. for 6 h. The obtained product was cooled to room temperature. The obtained luminescent material was represented by the chemical formula of $NaY_{0.9}SiO_4$: $0.1Tb^{3+}$.

Figure 2:
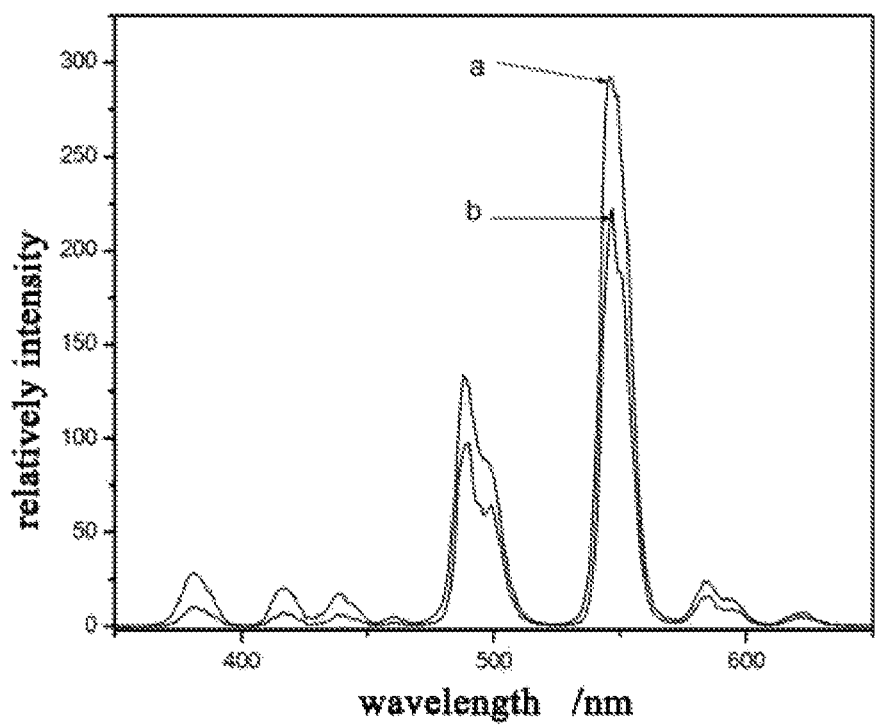
FIG. 2 shows an emission spectrum of the silicate luminescent material doped with metal nano particles ($NaY_{0.9}SiO_4$: $0.1Tb^{3+}$ containing Ag) of Example 8, compared to the luminescent material without Ag nanoparticles ($NaY_{0.9}SiO_4$: $0.1Tb^{3+}$) of Comparative Example 1. Curve a is an emission spectrum of the silicate luminescent material doped with metal nano particles ($NaY_{0.9}SiO_4$: $0.1Tb^{3+}$ containing Ag) of Example 8, curve b is an emission spectrum of the luminescent material without Ag nanoparticles ($NaY_{0.9}SiO_4$: $0.1Tb^{3+}$) of Comparative Example 1.

FIG. 2 shows an emission spectrum of the silicate luminescent material doped with metal nano particles ($NaY_{0.9}SiO_4$: $0.1Tb^{3+}$ containing Ag) of Example 8, compared to the luminescent material without Ag nanoparticles ($NaY_{0.9}SiO_4$: $0.1Tb^{3+}$) of Comparative Example 1. Curve a is an emission spectrum of the silicate luminescent material doped with metal nano particles ($NaY_{0.9}SiO_4$: $0.1Tb^{3+}$ containing Ag) of Example 8, curve b is an emission spectrum of the luminescent material without Ag nanoparticles ($NaY_{0.9}SiO_4$: $0.1Tb^{3+}$) of Comparative Example 1.

As shown in FIG. 2, under excitation by cathode ray at 5 KV, luminescent intensity of the silicate luminescent material doped with metal nano particles containing Ag nanoparticles ($NaY_{0.9}SiO_4$: $0.1Tb^{3+}$ containing Ag) is increased by 30%, compared to the luminescent material without Ag nanoparticles.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A silicate luminescent material doped with metal nano particles represented as:

$MLn_{1-x}SiO_4$:xRE, containing A, wherein M is one or two elements selected from Li, Na and K; Ln is one or two elements selected from Y, Sc, La and Lu; A is a metal nano particle selected from Ag, Au, Pt, Pd and Cu; RE is one or two ions selected from Eu, Gd, Tb, Tm, Sm, Ce and Dy; x is a stoichiometric number in a range of $0<x\le0.1$; y is a molar of A to M in a range of $0<y\le0.005$.

2. The silicate luminescent material doped with metal nano particles according to claim 1, wherein x is in a range of $0.001\le x\le0.04$, y is in a range of $0.00003\le y\le0.003$.

3. A method for preparing silicate luminescent material doped with metal nano particles, comprising:

S1. according to the stoichiometric ratio of corresponding elements in the chemical formula of $MLn_{1-x}SiO_4$:xRE containing A, weighing compound containing M, compound containing Ln, compound containing RE and silica aerogel containing A, then grinding and mixing to obtain mixed powders;

S2, in air or in reducing atmosphere, calcining the mixed powders obtained from S1 at a constant temperature ranged from 800° C. to 1600° C. for 1 h to 10 h; then cooling to room temperature, taking out the calcined matter and grinding to obtain silicate luminescent material doped with metal nano particles represented as $MLn_{1-x}SiO_4$:xRE containing A; wherein M is one or two elements selected from Li, Na and K; Ln is one or two elements selected from Y, Sc, La and Lu; A is a metal nano particle selected from Ag, Au, Pt, Pd and Cu; RE is one or two ions selected from Eu, Gd, Tb, Tm, Sm, Ce and Dy; x is a stoichiometric number in a range of $0<x\le0.1$; y is a molar ratio of A to M in a range of $0<y\le0.005$.

4. The method for preparing silicate luminescent material doped with metal nano particles according to claim 3, wherein in S1, the compound containing M is selected from oxide of M, nitrate of M, carbonate of M and oxalate of M; the compound containing Ln is selected from oxide of Ln, nitrate of Ln, carbonate of Ln and oxalate of Ln; the compound containing RE is selected from oxide of RE, nitrate of RE, carbonate of RE and oxalate of RE.

5. The method for preparing silicate luminescent material doped with metal nano particles according to claim 3, wherein in S1, the silica aerogel containing A is prepared by the following steps:

S11. weighing silica aerogel and adding into ethanol solution containing A ions or colloidal nanoparticles of A, then stirring at 50° C. to75° C. for 0.5 h to 3 h to thoroughly dissolve silica aerogel, obtaining mixed solution; wherein molar concentration of A ions or colloidal nanoparticles of A is in a range of $1.25\times10^{-3}$ mol/L to $1.5\times10^{-5}$ mol/L;

S12. stirring and ultrasonically treating the mixed solution, then drying the mixed solution at 60° C. to 150° C. to remove solvent, obtaining dried matter;

S13. grinding the dried matter into powders, calcining the powders at 600° C. to 1300° C. for 0.5 h to 3 h, cooling to room temperature to obtain silica aerogel containing A.

6. The method for preparing silicate luminescent material doped with metal nano particles according to claim 5, wherein in S11, molar ratio of silica aerogel to A ions or colloidal nanoparticles of A is in a range of $3.3\times10^4$ to 328:1.

7. The method for preparing silicate luminescent material doped with metal nano particles according to claim 6, wherein in S11, aperture size of the silica aerogel is in a range of 20 nm to 100 nm, porosity is in a range of 92% to 98%.

8. The method for preparing silicate luminescent material doped with metal nano particles according to claim 3, wherein in S2, the reducing atmosphere is mixed gases of $N_2$ and $H_2$ in a volume ratio of 95:5.

9. The method for preparing silicate luminescent material doped with metal nano particles according to claim 3, wherein x is in a range of $0.001\le x\le0.04$, y is in a range of $0.00003\le y\le0.003$.

10. The method for preparing silicate luminescent material doped with metal nano particles according to claim 4, wherein x is in a range of $0.001\le x\le0.04$, y is in a range of $0.00003\le y\le0.003$.

11. The method for preparing silicate luminescent material doped with metal nano particles according to claim 5, wherein x is in a range of $0.001\le x\le0.04$, y is in a range of $0.00003\le y\le0.003$.

12. The method for preparing silicate luminescent material doped with metal nano particles according to claim 6, wherein x is in a range of $0.001\le x\le0.04$, y is in a range of $0.00003\le y\le0.003$.

13. The method for preparing silicate luminescent material doped with metal nano particles according to claim 7, wherein x is in a range of $0.001\le x\le0.04$, y is in a range of $0.00003\le y\le0.003$.

14. The method for preparing silicate luminescent material doped with metal nano particles according to claim 8, wherein x is in a range of $0.001\le x\le0.04$, y is in a range of $0.00003\le y\le0.003$.

* * * * *